Sept. 5, 1933.   O. KASELITZ   1,925,587

METHOD OF PRODUCING POTASSIUM NITRATE

Filed June 17, 1929

Inventor
Oscar Kaselitz,
By Henry C. Parker
Assoc. Attorney

UNITED STATES PATENT OFFICE 1,925,587

METHOD OF PRODUCING POTASSIUM NITRATE

Oscar Kaselitz, Berlin, Germany

Application June 17, 1929, Serial No. 371,723, and in Germany December 3, 1928

8 Claims. (Cl. 23—102)

My invention refers to the production of potassium nitrate, more especially by the interaction of aluminium nitrate and potassium chloride and has for its particular object to provide means whereby potassium nitrate can be produced in a simpler and more efficient manner than was hitherto possible.

In former times almost all potassium nitrate on the market was produced by the interaction of sodium nitrate (Chili saltpetre) with potassium chloride. In the present days potassium nitrate is produced only from the nitrous gases resulting in the manufacture of nitric acid from the air and from the nitrates produced with the aid of these gases. Of these nitrates those of magnesium, calcium and ammonium have been converted, by interaction with potassium chloride, into potassium nitrate.

I have now found that aluminium can be utilized for this purpose with particular advantage insofar that the separation of the aluminium chloride resulting in the reaction with aluminium nitrate and potassium chloride, can easily be effected so that the liquors can always be returned into the process, and that further aluminium chloride can easily be converted by thermic decomposition into hydrochloric acid and aluminium oxide, which latter may be reconverted into nitrate and returned into the operation, so that it is merely necessary to introduce fresh quantities of potassium chloride and nitric acid. Besides potassium nitrate also hydrochloric acid is obtained.

The process according to this invention is based on the fact that in the interaction of aluminium nitrate and potassium chloride according to the equation

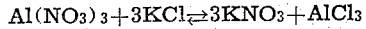

$$Al(NO_3)_3 + 3KCl \rightleftarrows 3KNO_3 + AlCl_3$$

the resulting aluminium chloride as well as the potassium nitrate can be separated out as solids.

In practising my invention I evaporate, preferably in vacuo, in order to prevent the formation of hydrochloric acid, and at moderate temperature, a solution, saturated at 0° C., of potassium nitrate, aluminium chloride and aluminium nitrate. This solution is concentrated so far that on cooling to 20° C., whereby $AlCl_3 + 6H_2O$ is separated out, a mother liquor is obtained which contains about 36 grams $NO_3$ per 100 grams $H_2O$. To this mother liquor are now added KCl and aluminium nitrate, the quantities added being equivalent to the $AlCl_3 + 6H_2O$ which had separated out. The water removed by evaporation and in the form of crystal water in the $AlCl_3 + 6H_2O$ is replaced and the solution is then cooled down to 0° C. in order to separate out potassium nitrate. The mother liquor resulting in this operation is again evaporated as above described. I may also cool down below 0° C., although by so doing I do not obtain a considerably greater yield of $KNO_3$. The $AlCl_3 + 6H_2O$ is either sold as such or is decomposed by heating with steam into hydrochloric acid and aluminium oxide or aluminium hydroxide (both in a state soluble in mineral acids) which can be reconverted by means of nitric acid or nitrous gases into aluminium nitrate, which is then returned into the process.

The above shows that this process is a cyclic process, in which the liquors are always reutilized and evaporated and filled up with water and in which potassium nitrate and aluminium chloride are recovered in equivalent quantities, while equivalent quantities of the starting materials (KCl and aluminium nitrate) are added. The products which separate out are pure and require only being slightly washed in order to remove the mother liquor which adheres to them. The wash-waters are utilized also in the process.

Under the conditions of operation above described the chlorine resulting in the decomposition of potassium chloride can be removed from the liquors so that the mother liquors can be always returned into the process for a production of further quantities of potassium nitrate.

I have now found that it is more advantageous to start from a liquor which at 0° C. is saturated with the chlorides and $KNO_3$, i. e. saturated with $AlCl_3$, KCl and $KNO_3$. If this liquor is concentrated by evaporation—in vacuo, if desired—until on cooling to 20° C. a liquor is obtained which contains 19.5 grams $NO_3$ in 100 grams water, only about 56% of the quantity of water must be evaporated per unit of nitrate, which is to be evaporated in accordance with the method above described. Apart therefrom the liquors thus obtained are better fit for further operations in view of their lower specific weight and consequent lower viscosity. The further treatment of $AlCl_3 \cdot 6H_2O$ is effected, as described above, or the $AlCl_3 \cdot 6H_2O$ can be used or sold as such.

Example 1

The starting liquor is saturated at 0° C. with $Al(NO_3)_3$, $KNO_3$ and $AlCl_3$ and contains per 100 grams H₂O 22.15 grams Cl, 17.67 grams NO₃, 2.52 grams K and 7.59 grams Al.

150 grams of this liquor are heated to about 50° C. in a vacuum of about 50 mms mercury column until 40.7 grams water are removed by evaporation, a liquor being obtained which contains 36 grams NO₃ per 100 grams water. This liquor is now cooled to 20° C. and 21 grams AlCl₃.6H₂O (equal to 11.6 grams anhydrous AlCl₃) separate out and can easily be filtered by suction. The crystals are freed from the adhering liquor by slight washing with saturated AlCl₃ solution. The AlCl₃ thus obtained can be reduced to alumina by heating or by treating with superheated steam and the alumina is reconverted into aluminium nitrate with nitric acid and is returned into the process.

To this liquor are now added, according to the quantity of AlCl₃ which has separated out, 50.1 grams water, to replace the 40.7 grams water removed by evaporation and 9.4 grams crystal water, and 18.6 grams Al(NO₃)₃, preferably in the form of Al(NO₃)₃·9H₂O. After the salt has dissolved, 19.5 grams KCl are added and the liquor is now cooled slowly to 0° C. under stirring, whereupon 26.5 grams KNO₃ separate out. This salt is now freed from the adhering liquor by slight washing with cold water and about 25 grams pure KNO₃ are obtained. The washing liquor can be added to the concentrated liquor instead of water.

*Example 2*

The liquor used as starting material is saturated at 0° C. with KNO₃, AlCl₃ and KCl and contains per 100 grams water 31.32 grams Cl, 11.47 grams NO₃, 2.63 grams K and 9 grams Al.

154.5 grams of this liquor are concentrated in vacuo at about 50° C., until 29.4 grams water have been evaporated. The liquor is now cooled to 20° C. and there separate out 26.7 grams AlCl₃·6H₂O (equal to 14.8 grams anhydrous AlCl₃). This salt is freed from the adhering liquor by washing with saturated AlCl₃ solution and can then be treated further as described with reference to Example 1 to convert it into alumina or aluminium nitrate. The quantity of water removed from the liquor (29.4 grams evaporated and 11.9 grams crystal water=41.3 grams) is now restored to it together with 23.7 grams Al(NO₃)₃ preferably in the form of Al(NO₃)₃·9H₂O. After dissolution of the salt 24.9 grams KCl are added and the solution is cooled under continuous stirring to 0° C., whereupon 33.7 grams KNO₃ separate out. The adhering liquor is removed by washing with some cold water and the washing liquor can be added to the concentrated mother liquor instead of water. 32 grams pure KNO₃ are thus obtained.

*Example 3*

The original solution contains, at a temperature of 20° C., 38.1 grams KCl, 54.8 grams KNO₃, 148.3 grams Al(NO₃)₃ and 325.8 grams AlCl₃ per litre. To 1 cbm. of this solution are added at 20° C. 54.8 kilograms aluminium hydroxide suspended in 45 kilograms water and a mixture of nitrous gases and air is introduced, corresponding to the formation of a neutral aluminium nitrate according to the equation $$2Al(OH)_3 + 6NO_2 + 3O = 2Al(NO_3)_3 + 3H_2O.$$

During this operation the temperature should not be raised considerably above 20° C.

There separate out at first 145 kilograms AlCl₃+6H₂O, which are separated from the mother liquor at 20° C. by filtering and suction. The mother liquor contains per litre 260.5 grams Al(NO₃)₃, 262.5 grams AlCl₃ and 97.1 grams KNO₃. To this mother liquor is now added a quantity (134 kilograms) of potassium chloride which is equivalent to the aluminium chloride which had been separated out. The conversion of the potassium chloride into potassium nitrate comes to an end after short stirring and 182 kilograms pure potassium nitrate separate out and are freed from the adhering liquor by slight washing. The mother liquor has the same composition and volume as the starting liquor and is instantly used in a new operation. The washwater is used for the suspension of the aluminium hydroxide.

I have further found that the two processes, the separation of potassium nitrate and the separation of aluminium chloride, can be conducted at substantially the same temperature without an evaporation of the liquors being required. The potassium nitrate precipitated by the addition of potassium chloride, from a solution which is saturated with aluminum nitrate, potassium nitrate and aluminium chloride, and from the solution thereby obtained the aluminium chloride formed in the reaction is precipitated by adding aluminium nitrate at the point, at which the solution is saturated with aluminium chloride, potassium chloride and potassium nitrate. To the solution thus obtained is again added potassium chloride, whereby potassium nitrate is precipitated in the same manner as above so that the process can be carried through with the same liquors without any evaporation being necessary. The aluminium nitrate can be easily produced from nitric acid or nitrous gases and aluminium oxide or hydroxide, which is for instance obtained by thermic decomposition of the aluminium chloride resulting in the process. The aluminium nitrate can be produced by adding to the mother liquor, to which it shall be added, aluminium oxide or hydroxide and nitric acid or nitrous gases, the percentage of water in the solution being regulated in such manner that after the precipitation of the aluminium chloride the original concentration is maintained. Therefore 6 mols. water have to be supplied from without for each molecule aluminium and the same must also be taken care of when adding aluminium nitrate containing less water. The use of an aluminium nitrate containing more water would result in a gradual dilution of the liquors. It is, however, a very simple matter to obtain an aluminium nitrate having a lower percentage of water.

The separation of small quantities of potassium nitrate besides aluminium chloride can be avoided by slightly raising the temperature when precipitating the aluminium chloride. Such a rise of temperature is admissible in view of the fact that the degree of solubility of aluminium chloride is independent within wide limits from the temperature. Apart from this slight increase of temperature the process can be carried through in both phases at the same temperature.

It is seen from the above description that the aluminum nitrate employed in my invention can be incorporated into the concentrated salt solutions either by direct addition or by forming it in the solution by the addition of an oxygen compound of aluminum followed by the addition of nitrous gases and air, or nitric acid. The generic process of my invention comprises preparing a concentrated solution containing potassium nitrate, aluminum chloride and a third salt, having ions common to both $KNO_3$ and $AlCl_3$ selected from a group consisting of potassium chloride and aluminum nitrate; incorporating in said solution aluminum nitrate; adding potassium chloride; recovering from said solution aluminum chloride and potassium nitrate as separate precipitates, and recycling the resulting solution in a repetition of the process.

My invention may be illustrated by the accompanying drawing which shows, in the form of flow sheets, two embodiments thereof. In this showing a concentrated solution (usually saturated) of aluminum chloride, potassium nitrate and either aluminum nitrate or potassium chloride is treated by successive steps, including incorporating into said solution aluminum nitrate and adding potassium chloride, with the ultimate formation and separation of potassium nitrate and aluminum chloride. The several steps of the processes are indicated on the flow sheets by appropriate legends. In this showing:

Fig. 1 represents the processes of Examples 1 and 2, while

Figure 1:
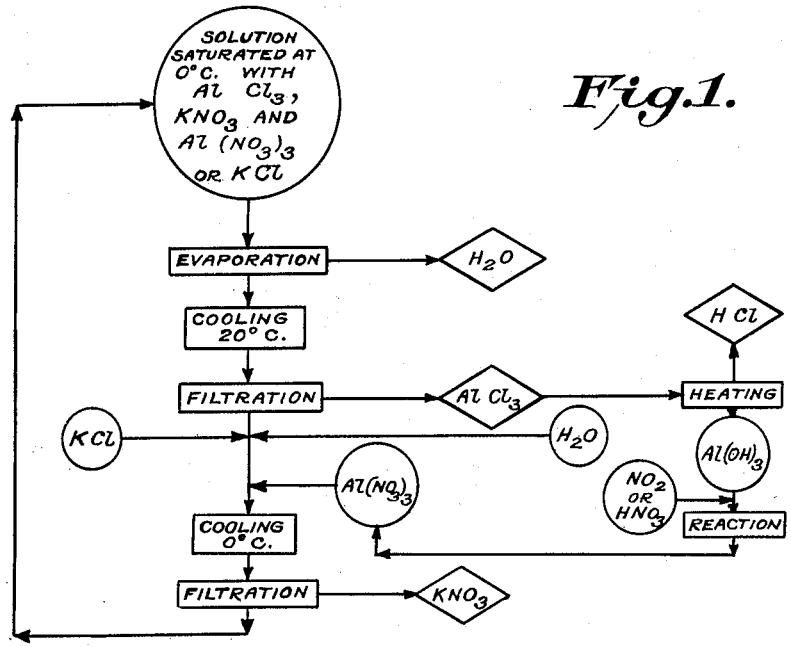
Figure 2:
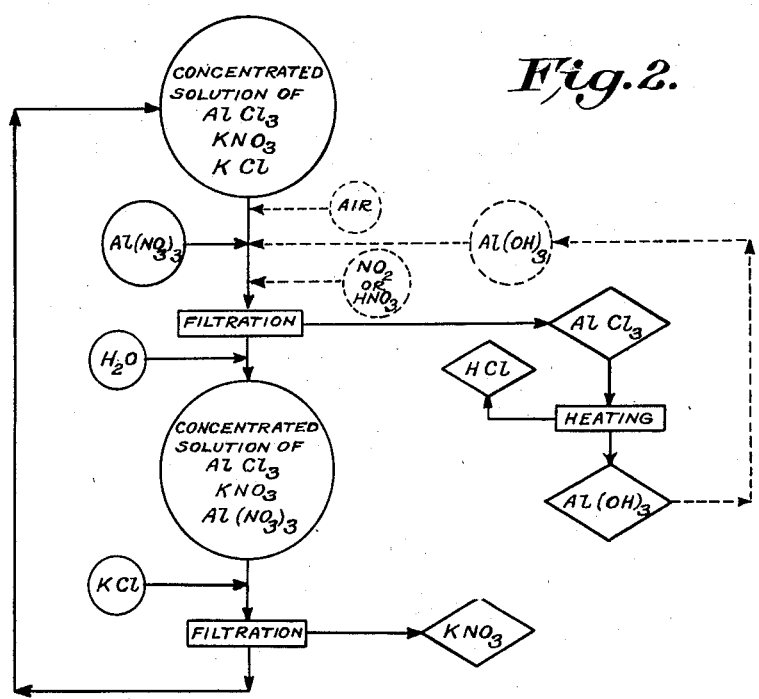
Fig. 2 represents the process of Example 3 and also the process above described wherein the separation of potassium nitrate and of aluminum chloride are conducted at substantially the same temperatures without evaporation.

It is believed that the processes represented by the flow sheets can be readily understood from the above description. The steps such as evaporation, filtration and cooling are indicated on the flow sheets as rectangles. The materials entering the reactions are indicated by circles and the materials separated out and recovered by diamond shaped outlines.

Various changes may be made in the details disclosed in the foregoing specification without departing from the invention or sacrificing the advantages thereof.

Throughout this specification and the claims affixed thereto the expression " nitrous gasses " is intended to exclusively cover gases containing the compound $NO_2$ and/or the compound $NO$, while the expression "oxygen compounds of aluminium" means aluminium oxide and aluminium hydroxide exclusively.

I claim:—

1. The method of producing potassium nitrate comprising incorporating aluminium nitrate in a solution of potassium chloride to form a solution saturated with potassium nitrate, aluminium chloride and aluminium nitrate, concentrating said solution by evaporation, whereby on cooling $AlCl_3 \cdot 6H_2O$ is separated out, incorporating in the mother liquor separated therefrom additional quantities of potassium chloride and aluminium nitrate equivalent to the aluminium chloride separated out, adding water to restore to the solution the constitution existing before evaporation, cooling, separating potassium nitrate precipitated thereby, evaporating the remaining solution and proceeding further as in the first operation.

2. The method of producing potassium nitrate comprising incorporating in a solution of potassium chloride aluminum nitrate to form a solution saturated with potassium nitrate, aluminium chloride and aluminium nitrate, adding potassium chloride to precipitate potassium nitrate, removing same, incorporating in the mother liquor additional aluminium nitrate to precipitate aluminium chloride, removing same, adding to the filtrate potassium chloride and proceeding further as in the first operation.

3. The method of producing potassium nitrate comprising concentrating by evaporation a solution saturated with potassium nitrate, aluminium chloride and potassium chloride, until on cooling solid $AlCl_3 \cdot 6H_2O$ is separated out, incorporating in the mother liquor separated therefrom quantities of potassium chloride and aluminium nitrate equivalent to the aluminium chloride separated out, adding water to restore to the solution the constitution existing before evaporation, cooling, separating potassium nitrate precipitated thereby, evaporating the remaining solution and proceeding further as in the first operation.

4. In the method claimed in claim 2 the step of incorporating in the mother liquor aluminium nitrate by adding to said liquor nitric acid and an oxygen compound of aluminium soluble in mineral acids.

5. In the method claimed in claim 2 the step of incorporating in the mother liquor aluminium nitrate by adding to said liquor an oxygen compound of aluminium soluble in mineral acids, and introducing nitrous gases into the liquor thus obtained.

6. The method of producing potassium nitrate comprising adding to a solution of potassium chloride an oxygen compound of aluminium soluble in mineral acids, acting on the liquor thus obtained with nitric acid to precipitate aluminium chloride, separating said aluminium chloride and increasing the potassium concentration of the mother liquor to precipitate potassium nitrate.

7. The method of producing potassium nitrate comprising adding to a solution of potassium chloride an oxygen compound of aluminium soluble in mineral acids, acting on the liquor thus obtained with nitrous gases to precipitate aluminium chloride, separating said aluminium chloride and increasing the potassium concentration of the mother liquor to precipitate potassium nitrate.

8. In the manufacture of potassium nitrate from aluminium nitrate and potassium chloride, the process which comprises preparing a concentrated solution containing potassium nitrate, aluminum chloride and a third salt, having ions common to both $KNO_3$ and $AlCl_3$ selected from a group consisting of potassium chloride and aluminum nitrate; incorporating in said solution aluminum nitrate; adding potassium chloride; recovering from said solution aluminum chloride and potassium nitrate as separate precipitates, and recycling the resulting solution in a repetition of the process.

OSCAR KASELITZ.